United States Patent [19]
Leybourne, III et al.

[11] 3,867,104
[45] Feb. 18, 1975

[54] POLYMERIZER REACTOR

[75] Inventors: Allen E. Leybourne, III; Terry H. Baker, both of New Bern, N.C.

[73] Assignee: Monsanto Company, St. Louis, Mo.

[22] Filed: Apr. 12, 1973

[21] Appl. No.: 350,460

[52] U.S. Cl.............. 23/285, 23/252 R, 198/213, 198/215, 259/3
[51] Int. Cl....... B01f 15/00, B01j 1/00, B65g 33/00
[58] Field of Search...... 23/285, 252 R, 288 E, 284; 260/695, 94.9 P; 259/3, 84, 85, 9, 10, 4; 198/213, 215

[56] References Cited
UNITED STATES PATENTS

| | | | |
|---|---|---|---|
| 3,476,523 | 11/1969 | Leybourne | 23/285 |
| 3,580,545 | 5/1971 | O'Brien | 259/3 |
| 3,634,042 | 1/1972 | McCown | 23/285 |

*Primary Examiner*—Joseph Scovronek
*Attorney, Agent, or Firm*—Thomas Y. Awalt, Jr.

[57] ABSTRACT

A conveying apparatus for incorporation into a finisher comprising a portion of a cylindrical member being a helical segment and having a number of substantially parallel helical ridges on a least one surface thereof forming helical channels.

1 Claim, 2 Drawing Figures

POLYMERIZER REACTOR

BACKGROUND OF THE INVENTION

1. Field of the Invention

This invention relates generally to finishers and more specifically to an apparatus which is to be incorporated into a finisher for conveying material through the finisher.

2. Description of the Prior Art

Heretofore, various means have been employed to transfer and convey viscous molten polymeric materials along the length of a finisher at a desired rate and at the same time provide for sufficient generation of surface area. Although the intended function has been more or less accomplished, the homogeneous polymer which results from uniform axial mixing, through constant intermingling along with reasonably uniform throughput has not often been attainable. Insufficient intermingling and excessive or non-uniform axial mixing results in polymers of poorer quality due to degradation which is directly related to holdup time within a vessel or in any particular place within the vessel.

SUMMARY OF THE INVENTION

Accordingly, the above-mentioned difficulties are overcome with a conveying apparatus which, when incorporated into a finisher, will serve to intermingle the therein contained viscous material and convey the same from one end to another with a minimum of axial mixing. The structure involved is that of a portion of a cylindrical member being a helical segment having a number of substantially parallel helical ridges on at least one of the radial surfaces thereof which form helical channels. The apparatus is juxtaposed and cooperates with film-forming means within the finisher and conveys the polymer along the film-forming means with continued intermingling, thus reducing the likelihood of thermal degradation while at the same time insuring that all of the material remains in the finisher substantially the same length of time.

DESCRIPTION OF THE PREFERRED EMBODIMENTS

Figure 2:
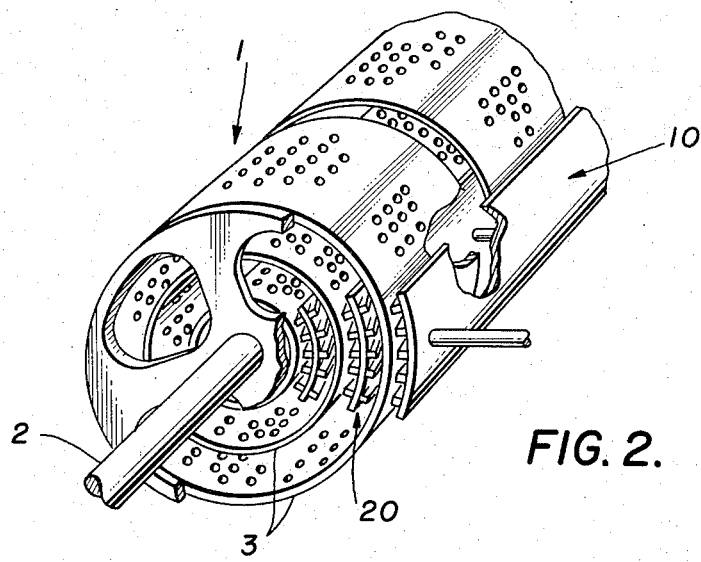
FIG. 2 is a perspective view of a portion of a finisher cage with embodiments of conveying apparatus according to this invention.

In accordance with this invention, there is shown in FIG. 2 a portion of a revolvable cage, generally denoted by reference number 1, being made up of a shaft 2 and concentric perforated cylinders 3. Exterior of cage 1 and adjacent thereto is positioned and maintained one embodiment of a conveying apparatus, generally denoted by reference numeral 10, according to this invention.

Positioned and maintained between perforated cylinders 3 is another embodiment of a conveying apparatus, generally denoted by reference numeral 20, according to this invention. This embodiment is better illustrated in FIG. 1 wherein associated apparatus has been omitted.

The finisher referred to above is, in its simplest form, a vessel used in the production of polymeric materials by melt condensation polymerization wherein the polymerization reaction is carried to its completion while volatile by-products are removed in the course of a high temperature mix.

The cage referred to above becomes part of the finisher when incorporated thereinto, and serves to intermingle and mix polymer which is passed therethrough upon rotation. Although intermingling and mixing are effected, this is not to be taken as the most important aspect of a finisher of this type. Surface generation with corresponding evolution of vaporous by-products is the primary function of the finisher. Without sufficient conveying means, polymer throughput is dependent solely upon the difference in liquid level or pressure between the input and output ends of the finisher. It can be appreciated that without efficient conveying means, excessive or non-uniform axial mixing may take place with corresponding thermal degradation or non-homogeneity. The ideal conveying means serves not only to convey, but also to reduce the amount of axial mixing; insuring that all polymer entering the finisher will remain therein the same length of time.

Figure 1:
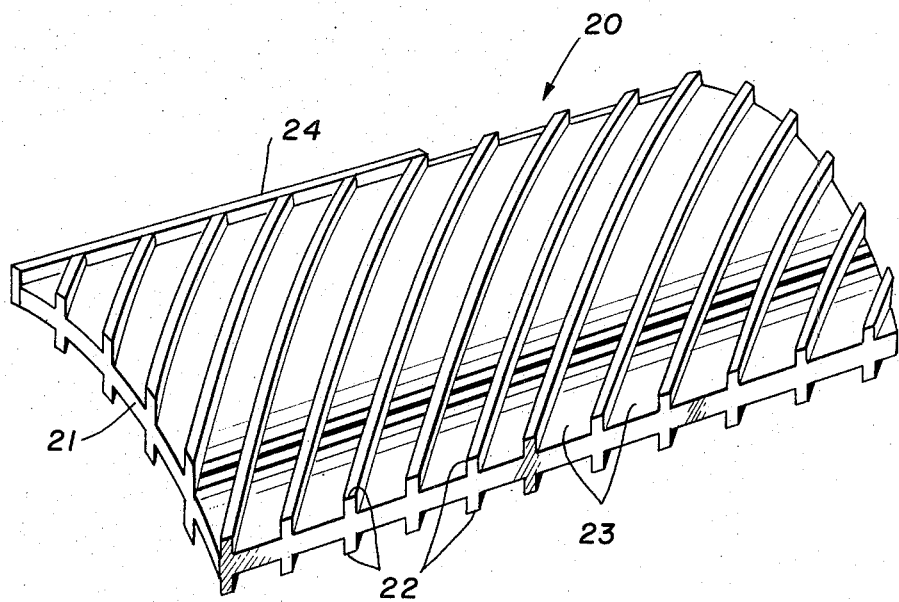
FIG. 1 is a perspective view of one embodiment of a conveying apparatus according to this invention.

With this in mind, and referring to FIGS. 1 and 2, it can be seen that the conveying means of this invention will provide for reduced axial mixing and sufficient conveying to effect the desired quality of polymer exiting the finisher.

Referring specifically to FIG. 1, the conveying means according to this invention is an apparatus 20 which is made up of a portion 21 of a cylindrical member having substantially parallel helical ridges 22 on radial surfaces thereof forming helical channels 23. The width of apparatus 20 in a circumferential direction is to be limited by the determined length of ridges and channels which are factors dependent upon size, speed of rotation, viscosity, etc., and will be discussed in more detail later in the specification. In this sense, apparatus 20 is helically segmented; being a helical segment. The length of apparatus 20 is determined only by necessity; not being critical with respect to the factors influencing the width. It is ordinarily a fixed or stator member.

On the leading edge and secured to member 21 is an optional dam 24 which may serve as means for decreasing the conveying capabilities of apparatus 20. Dam 24 as shown extends across several channels 23. The height or length of dam 24 can be varied to produce the desired effect, and can dam channels on both sides of member 21 either alternately or continuously.

The portion of the cylindrical member referred to herein can be any portion as long as the length of the ridges and channels thereon do not exceed workable limits. For example it might be desirable if all channels were approximately the same length, but this would require a trapezoidal shaped member which would create difficulties in incorporating same into a finisher and increased space requirements. The mere fact that some of the ridges and channels are shorter than others is not a matter of concern when the overall result is tabulated.

The cylindrical member for effective operation will conform to the curvature of any cage with which it is associated; the arcuate surfaces of generation being substantially concentric with the helical projections or ridges approaching an associated cage.

Helical projections or ridges 22 extend and protrude generally radially from a radial surface of cylindrical member 21 forming valleys or channels therebetween which in effect grip a wall of polymer produced by the cage and convey same along the length of the cage. These ridges will extend from both of the radial surfaces when apparatus 20 is to be used between concentric cages, and from only one surface when only one cage is concerned. This is vividly illustrated in FIG. 1 of the drawing where the ridges appear and extend across on the inner and outer surfaces of member 21.

In the embodiment shown in FIG. 1, ridges 22 extend generally diagonally across a rectangular shaped portion of the cylindrical member, the angle of deflection of the polymer being determined generally by the length of the channels and the desired dwell-time in the finisher.

The significance of the helical segment can be explained analogously in terms of a canted blade scraping a portion of a buildup of viscous liquid or material on a surface. A second canted blade positioned directly behind the first would pick up virtually none of the material leaving the trailing edge of the first blade. If the leading edge of the second blade were positioned directly behind the trailing edge of the first blade, the material leaving the trailing edge of the first blade would be picked up by the leading edge of the second blade, thereby experiencing the effect of the entire length of the second blade. In this situation, a number of blades of determined length are necessary to intermingle the material since the relative position of the imaginary center-line material will remain substantially unchanged even when only two blades are used. In other words, the center portion of the material leaving the trailing edge of one blade will remain in the center throughout the length of second and subsequent blades if nothing is interposed to break up this pattern. By having the blades a determined length, the cage which acts in conjunction with the apparatus will change or alter this relative position after the material has left the vicinity of the blades. If the apparatus were to be wrapped completely around the cage, there would be negligible intermixing and unworkably high forwarding force resulting in a finisher output of extremely low molecular weight.

The determined length referred to above is dictated by effect; that being of a leading edge picking up the material which flows from a trailing edge in such a way that polymer cascades from one channel to another while being driven or conveyed. With such an arrangement, there is substantial intermingling, measured conveying and a minimum of axial mixing.

The apparatus of this invention can be incorporated into the apparatus disclosed and claimed in U.S. Pat. No. 3,563,710, and provide the means for conveying referred to therein.

Various changes and modifications may be made in practicing the invention without departing from the spirit and scope thereof, and therefore, the invention should not be limited except as defined in the appended claims.

We claim:

1. A polymerizer reactor comprising in combination: (A) a shaft rotating about its axis, (B) at least one rotor member comprising at least a segment each of a plurality of perforated hollow core cylinders being concentric with and surrounding a portion of said shaft, (C) means for coaxially supporting said perforated cylinders on said shaft, (D) a conveyor stator member comprising at least a portion of a cylindrical member having helical projections protruding radially and extending generally diagonally across at least one surface thereof, forming segmented helical channels, said helical channels being in working juxtaposition with at least one surface of at least one of said perforated hollow core cylinders, (E) a generally cylindrical vessel including the wall surrounding the outermost of said rotor and stator members, (F) means for introducing polymerizable material into said vessel, and (G) means for recovering polymerized material from said vessel.

* * * * *